US008520662B2

(12) United States Patent
Karaoguz et al.

(10) Patent No.: US 8,520,662 B2
(45) Date of Patent: *Aug. 27, 2013

(54) LOCATION-AWARE APPLICATION BASED QUALITY OF SERVICE (QOS) VIA A BROADBAND ACCESS GATEWAY

(75) Inventors: Jeyhan Karaoguz, Irvine, CA (US); Marc Abrams, Aliso Viejo, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1715 days.

This patent is subject to a terminal disclaimer.

(21) Appl. No.: 11/873,293

(22) Filed: Oct. 16, 2007

(65) Prior Publication Data

US 2008/0037525 A1    Feb. 14, 2008

Related U.S. Application Data

(63) Continuation of application No. 11/095,188, filed on Mar. 30, 2005, now Pat. No. 7,283,803.

(60) Provisional application No. 60/563,894, filed on Apr. 16, 2004.

(51) Int. Cl.
*H04L 12/66* (2006.01)
*G06F 15/16* (2006.01)
*G06F 15/173* (2006.01)
*H04M 3/42* (2006.01)
*H04W 24/00* (2009.01)

(52) U.S. Cl.
USPC ........... 370/352; 370/353; 370/354; 370/355; 370/356; 709/231; 709/246; 709/247; 455/414.2; 455/456.1

(58) Field of Classification Search
USPC ................. 370/352–356; 709/231, 246, 247; 455/414.2, 456.1
See application file for complete search history.

(56) References Cited

U.S. PATENT DOCUMENTS

| | | | |
|---|---|---|---|
| 6,259,785 B1 * | 7/2001 | Shaffer et al. ............ | 379/265.02 |
| 6,519,648 B1 * | 2/2003 | Eyal .............................. | 709/231 |
| 6,529,552 B1 * | 3/2003 | Tsai et al. ................ | 375/240.05 |
| 6,856,601 B1 * | 2/2005 | Bell et al. ....................... | 370/252 |
| 7,043,225 B1 * | 5/2006 | Patel et al. .................... | 455/405 |
| 7,096,029 B1 * | 8/2006 | Parupudi et al. ........... | 455/456.1 |
| 7,120,139 B1 | 10/2006 | Kung et al. | |
| 7,260,641 B2 * | 8/2007 | Decker et al. ................. | 709/233 |
| 7,283,803 B2 | 10/2007 | Karaoguz et al. | |
| 8,005,076 B2 * | 8/2011 | Gallagher et al. ............ | 370/353 |
| 2002/0038459 A1 * | 3/2002 | Talmola et al. ................. | 725/81 |
| 2004/0193707 A1 * | 9/2004 | Alam et al. ................... | 709/223 |
| 2004/0248583 A1 * | 12/2004 | Satt et al. .................... | 455/452.2 |
| 2005/0128995 A1 * | 6/2005 | Ott et al. ....................... | 370/349 |
| 2006/0291455 A1 * | 12/2006 | Katz et al. ..................... | 370/355 |
| 2009/0061860 A1 * | 3/2009 | Jiang ............................ | 455/433 |

* cited by examiner

*Primary Examiner* — Asad Nawaz
*Assistant Examiner* — Kai Chang
(74) *Attorney, Agent, or Firm* — Brinks Hofer Gilson & Lione

(57) ABSTRACT

A system and method supporting access to multimedia information based upon user-defined quality of service criteria is disclosed. A broadband access gateway may coordinate network behavior during the transition of an access device among communication pathways having different available capacities. Adjustments in bit rates and levels of compression may be made based upon the user-defined quality of service criteria. The user may be notified when network conditions disallow support for the desired quality of service, and may choose to override selected criteria. The user-defined quality of service criteria may be stored within the gateway and associated with a user, or may be located in the access device and accessible to the gateway.

17 Claims, 7 Drawing Sheets

LOCATION-AWARE APPLICATION BASED QUALITY OF SERVICE (QOS) VIA A BROADBAND ACCESS GATEWAY

RELATED APPLICATIONS

The present application is a continuation of U.S. patent application Ser. No. 11/095,188 entitled "LOCATION-AWARE APPLICATION BASED QUALITY OF SERVICE (QOS) VIA A BROADBAND ACCESS GATEWAY", filed Mar. 30, 2005, now U.S. Pat. No. 7,283,803, which makes reference to, claims priority to, and claims benefit of U.S. Provisional Patent Application Ser. No. 60/563,894, entitled "Method And System For Handling And Backhauling Traffic From A Wired And/Or Wireless WAN, LAN, And/Or PAN Using A Broadband Access Gateway", filed Apr. 16, 2004, the complete subject matter of each of which is hereby incorporated herein by reference, in its entirety.

The present application makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety.

The present application also makes reference to U.S. patent application Ser. No. 11/095,842, entitled "Registering Access Device Multimedia Content Via a Broadband Access Gateway", filed Mar. 30, 2005, the complete subject matter of which is hereby incorporated herein by reference, in its entirety

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

The use of digital media is growing at an extremely rapid pace. Most consumers today have a variety of devices that gather, store, process, generate, communicate, play back, and/or display information electronically, in a digital form. Examples of such devices include digital still and video cameras, personal digital assistants (PDAs), laptop and desktop personal computer (PC) systems, video cassette recorders (VCRs), personal video recorders (PVRs), document and photo scanners, digital and high definition television sets, stereo audio equipment, and cellular phones, to name only a few. The use of portable devices capable of exchanging digital media via a wireless communication link offers the consumer the opportunity to enjoy multimedia entertainment including, for example, audio and video media while traveling. Present day wide area communications systems such as wireless cellular networks support limited bandwidth for transmission of data, and therefore restrain access to high-quality multimedia information. Broadband access to multimedia information, however, is spreading quickly, and wireless broadband standard such as IEEE 802.11 can support improved quality of service compared with wide area wireless alternatives such as cellular. Support for switching of consumer electronic devices from one access path such as, for example, a cellular network, to another access path such as, wireless broadband, during media access is virtually non-existent. Most current cellular phones cannot access wireless broadband networks, and devices able to access wireless broadband networks do not normally support access to data via cellular service providers.

Access to streaming (real-time) multimedia programming generally requires that the user be aware of the capabilities of the device being used for access, and may require that the user specifically access multimedia information content that has been prepared with the capabilities of the access device in mind. Awareness and understanding of such details exceeds the interest and fear of the unknown of the majority of consumers. This places unnecessary limits on the market for flexible, mobile multimedia information content, equipment, and services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method supporting access to multimedia information by a plurality of access devices using location-aware quality of service management, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention relate to automatic management of the quality of service (QoS) provided a user accessing multimedia information content, depending upon the nature of the multimedia information, the access device used for media consumption, and the communications path used by the access device. The management of quality of service may be performed by a broadband access gateway that may permit broadband network access via, for example, a personal cellular microcell, a personal area network (PAN), a wired or wireless wide area network (WAN), wireless local area network (WLAN) or other type of network located within a premises such as, for example, a home, office, business, or the like. Services that may be available via such a broadband gateway connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. Examples of multimedia information include streaming video, broadcast video, voice, digital data, text, digitized audio, digitized still images, digitized video, and digitized music. The merging of these various types of networks may enable transparent communication of all types of media between access devices, which may be coupled in a wired or wireless fashion to one or more of these networks. In an embodiment of the present invention, access to services available through a wireless broadband gateway may be simplified, permitting their use by a wider group of users of access devices in, for example, homes, offices, and businesses.

Figure 1:
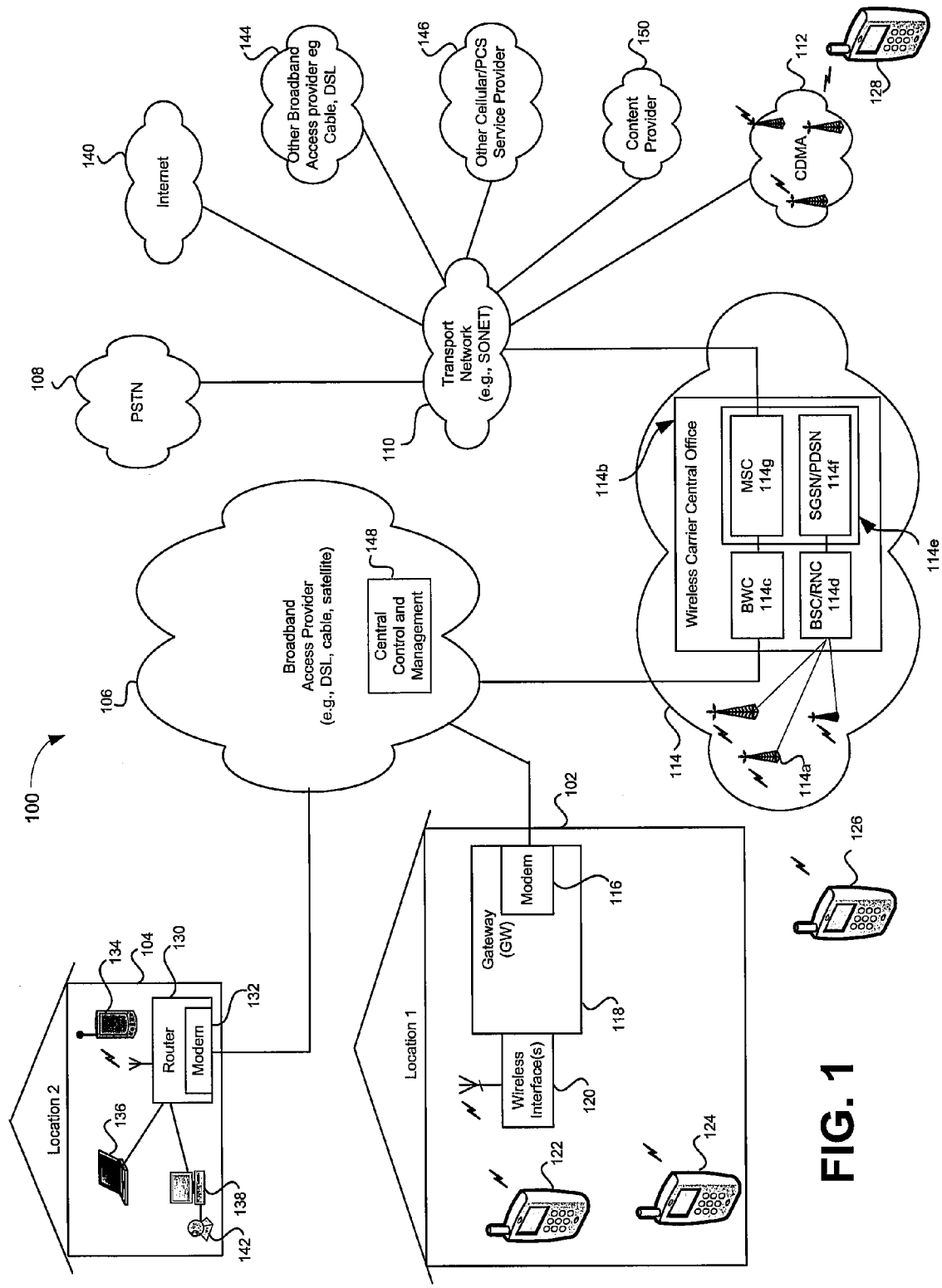
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family members into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may chose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device.

A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Café, the provider of the gateway may establish the service access levels or tiers that may be provided by the gateway 118.

When an access device is within the range of the gateway 118, wireless service is handed off from a serving cell site 114*a* in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may chose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video file and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114*a* in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114a in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a callers name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called party's terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access device may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the callers name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
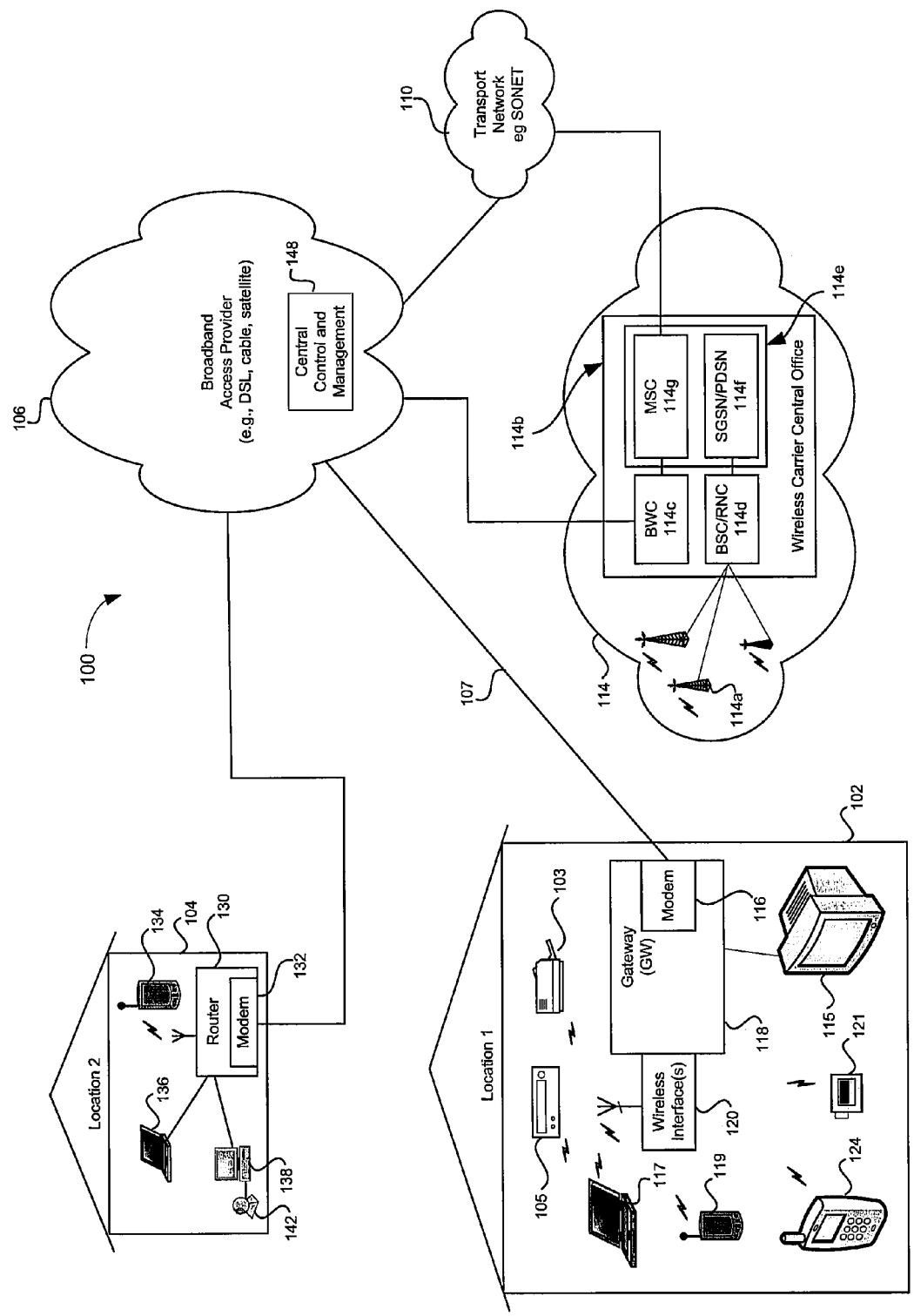
FIG. 2 shows a block diagram illustrating an exemplary communication system, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, and an array of access devices such as, for example, a printer 103, a stereo receiver 105, a laptop 117, a wireless personal digital assistant (PDA) 119, and a digital video camera 121, at location 102. The communication system 100 of FIG. 2 also comprises an access device 124 that may correspond, for example, to the access devices 122, 124, 126 of FIG. 1. A second location 104 within communication system 100 comprises a router 130 with a modem 132, and a plurality of wireless access devices. The plurality of access devices at the second location 104 may, for example, comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, that are not shown in FIG. 2, may also be coupled to the personal computer 138 and/or laptop 136. The wireless interface 120 may comprise a plurality of interfaces such as, for example, a Bluetooth interface, a cellular interface, and any combination of an IEEE 802.11a, b, g, and/or n interface, and/or an IEEE 802.15.3a ultra-wideband interface. Although the following discussion refers frequently to the capabilities and actions of the gateway 118 and wireless interface 120, the same may be said of the router 130 with the modem 132 of FIGS. 1 and 2, for example, without departing from the spirit and scope of the present invention.

In accordance with a representative embodiment of the present invention, a wireless access device such as access device 124 may be mobile, and may move between the personal area network/wireless local area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided by the gateway 118 and the modem 116 to wired or wireless access devices in the vicinity of location 102, and via router 130 and modem 132 to wired or wireless access devices in the vicinity of location 104, as shown in FIG. 2. This architecture may provide extended access to wireless networks such as, for example, the GSM network 114, CDMA network 112, other cellular/PCS service provider 146, Internet 140 and public switched telephone network 108, of FIG. 1. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114, or other wide area network of FIG. 1. Although the present example of FIG. 2 shows a GSM network 114, a representative embodiment of the present invention may be employed with respect to other wide area networks such as, for example, the CDMA network 112 and other cellular/PCS service provider 146, shown in FIG. 1.

When an access device such as, for example, the access device 124 of FIG. 2 moves into the coverage area of a personal area network of, for example, the wireless interface 120 and gateway 118, or the router 130, the access device 124 may be authenticated by the gateway 118 or router 130. The authentication may involve the sharing or exchange of identification and/or authentication information by the access device 124 with the gateway 118 or router 130. Details of an example of such an interaction are provided in U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety. Once the access device 124 has been authenticated to the gateway 118, the access device 124 may be permitted to exchange multimedia information and services available via the access devices in communication with the gateway 118, or via networks connected to the gateway 118. Information about the available multimedia information and services may be shared by and/or with the access device 124 via information exchanged by the access device 124 and the gateway 118 or router 130. Additional information about the advertising of such information may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

In a representative embodiment in accordance with the present invention, an access device such as, for example, access device 124 of FIG. 2 maybe engaged in accessing or consuming multimedia information via, for example, the GSM system 114. The term "consuming" is used herein to represent operations such as, for example, viewing video or still pictures, playing audio or music, reading text, etc. The quality of a viewing or listening experience, sometimes referred to by the term "quality of service" (QoS), is dependent upon a number of factors or criteria including, for example, the bandwidth that is available in the pathway from the multimedia information source to the access device at which consumption occurs. Other criteria affecting quality of service may include, for example, spatial resolution, color depth, frame rate, frequency of dropped frames, distortion in an audio signal, and acceptable delivery delay. For streaming video, the bandwidth needed to support such consumption depends upon a number of factors such as, for example, the number of pixels in each frame of video displayed, the number of bits per pixel, the number of frames displayed each second, the method of video encoding used, and the communication protocol used to transfer the multimedia information, to name only a few. For real-time audio playback, the bandwidth required may be a factor of, for example, the number of audio samples per second of playback, the number of bits per sample, the number of channels of audio being consumed (e.g., 1 for monaural, 2 for stereo, etc.), the type of coding used, and the communications protocols used to transport the multimedia information, in addition to other factors.

In a communication system such as, for example, the exemplary communication system 100 of FIG. 2, the bandwidth available for the exchange of multimedia information may be a function of the pathway used. Referring to FIG. 2, depending upon its physical location, an access device such as, for example, access device 124 may be served in a wireless fashion via the GSM network 114, or in a wired or wireless fashion via the gateway 118 or the router 130. The bandwidth available when being served by the gateway 118 may be greater or less than the bandwidth available when being served by the GSM network 114. The bandwidth available to a user of a communication access means such as, for example, the gateway 118 and GSM network 114 depends upon a number of factors. These factors may include, for example, the total capacity of the communication path, and the capacity currently being consumed by users, to name only two.

In a representative embodiment of the present invention, a user may desire to set a quality of service criterion defining the maximum bandwidth used. This may be due to a desire to limit usage costs, for example. The user may therefore set bandwidth limits, that may be enforced when an access device is being served by a particular delivery means. For example, a user may determine that the cost of data transmission via the GSM network 114 is unacceptable at bit rates of greater than 128 kbps. The user may provide cost of use or bandwidth criteria to a broadband access gateway in accordance with a representative embodiment of the present invention such as, for example, the gateway 118 of FIG. 2. Consistent with such user-defined parameter, the gateway 118 may coordinate with the GSM network 114 in order that when an access device being served by the gateway 118 such as, for example, the access device 124 is handed over to the GSM network 114, the bandwidth consumed does not exceed 128 kbps. The gateway 118 may, for example, coordinate such a transition with a central control and management function such as, for example, the central control and management block 148, and the GSM network 114 of FIG. 2. Although the present discussion makes reference to a GSM network, an embodiment of the present invention is not limited in this regard. Other wired and wireless networks may be employed, including but not limited to those shown in FIGS. 1 and 2, without departing from the spirit of the present invention.

In a representative embodiment of the present invention, a stream of multimedia information may be transcoded from a first bit rate to a second bit rate, to adjust bandwidth usage or to accommodate the capabilities of an access device. The term "transcode" is used herein to represent the modification of a bit rate of a coded stream of data. For example, multimedia information being delivered to the access device 124 by gateway 118 at a bit rate of, for example, 384 kbps, may be transcoded for consumption at a bit rate of, for example, 128 kbps for delivery via the GSM network 114. In a representative embodiment of the present invention, the bit rate available to support the consumption of multimedia information by the user of the access device 124 may be increased when the user moves from a path capable of lower bit rate communication such as, for example, the GSM network 114, into communication with a higher bit rate path such as, for example, the gateway 118. For example, the access device 124 of the above discussion may move from the coverage area of the gateway 118, into communication with the GSM network 114, and return to the coverage area of the gateway 118. In this example, the gateway 118 may coordinate with the GSM network 114, the central control and management block 148, and the access device 124 to transition the access device 124 from multimedia access using the 384 kbps capability of the gateway 118, to the 128 kbps connection with GSM network 114, and back to the 384 kbps capability of the gateway 118. Depending upon the bandwidth for which the multimedia information being accessed was encoded, the gateway 118 may adapt the multimedia information to a different bit rate using, for example, transcoding to a different bit rate code, or compression, to reduce the bandwidth to that available. The adjustment or adaptation of these two parameters of the multimedia information may be automatic, based upon the quality of service criteria defined by the user.

Figure 3:
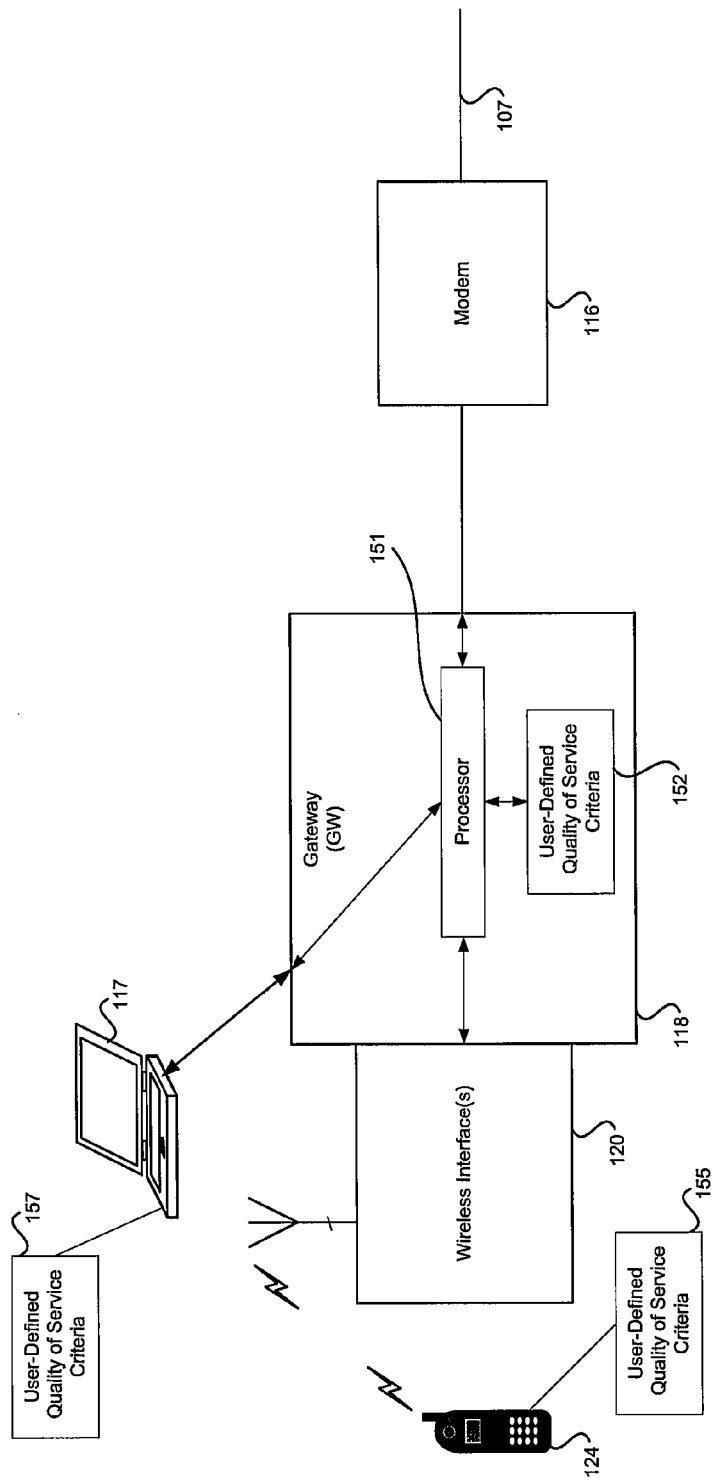
FIG. 3 is a block diagram of a portion of the communication system of FIG. 2, showing an exemplary broadband access gateway supporting user-defined quality of service criteria, which may correspond, for example, to the gateway of FIGS. 1 and 2, in accordance with a representative embodiment of the present invention.

FIG. 3 is a block diagram of a portion of the communication system 100 of FIG. 2, showing an exemplary broadband access gateway 118 supporting user-defined quality of service criteria, that may correspond, for example, to the gateway 118 of FIGS. 1 and 2, in accordance with a representative embodiment of the present invention. The broadband access gateway 118 of FIG. 3 is communicatively coupled to a wireless interface 120 that may correspond, for example, to the wireless interface 120 of FIGS. 1 and 2. The wireless interface 120 may permit the gateway 118 to communicate with wireless access devices such as, for example, the access device 124 that may be within the coverage area of the gateway 118. Such wireless access devices may include, for example, audio equipment such as a stereo receiver, speakers, printers, laptop computers, wireless personal digital assistants (PDAs), digital scanners, digital video cameras, mobile multimedia handsets, pointing devices, and the like. The gateway 118 of FIG. 3 is also communicatively coupled to a modem 116 supporting communication via the broadband connection 107. The modem 116 and the broadband connection 107 may correspond, for example, to the modem 116 and the broadband connection 107 of FIGS. 1 and 2. The gateway 118 of FIG. 3 comprises a processor 151 communicatively coupled to the wireless interface 120, the laptop 117, and the modem 116, and a set of user-defined quality of service criteria 152. The user-defined quality of service criteria 152 comprises a set of parameters or characteristics that define for a user or access device, the criteria or parameters used in managing the quality of service provided to the user. The access device 124 and laptop 117 laptop of FIG. 3 are shown as having local access to user-defined quality of service criteria 155, 157.

To illustrate with another example, a user may desire to have the optimum quality of service when viewing certain multimedia information, without regard to cost of consumption. For example, a radiologist may always wish to receive image information from a hospital as quickly as possible, and at the highest resolution possible, without concern for cost. In this example, the identity or source of the multimedia information to be consumed may be considered in determining the quality of service to be provided. The same radiologist, while accessing audio news materials, however, may wish to apply criteria limiting cost and allowing quality reductions or delays in delivery to be imposed. Based upon the location, source, or origin of the multimedia information, the quality of service criteria may be different. For a user requesting a still image, it may be of greater importance to receive a complete image quickly, than to receive a high resolution image. In such a situation, the user-defined quality of service criteria may permit adjustment of the spatial resolution of the image, the color depth, or the number of levels of gray scale used to permit the exchange of the image within criteria set by a user. Possible criteria include, for example, delivery delay or transfer time, the cost of delivery, and the desired quality of the image (e.g., spatial resolution, color depth, levels of gray scale), to name only a few. As discussed above, for some users the length of time taken to deliver a high resolution image may be of lesser importance, and that particular user may elect to wait for the full-resolution image.

At any point in time, a broadband access gateway such as, for example, gateway 118 may not be capable of supporting the quality of service desired by a user. This may be due, for example, to consumption of bandwidth by other access devices communicating with the gateway 118, or to the current bandwidth limitations of a network such as, for example, the communications network accessible via the broadband connection 107. The impact on the quality of service provided by gateway 118, due to loading on the broadband connection 107 or interconnected network may occur, for example, when the multimedia information being accessed is located not on an access device within the coverage area of the gateway 118, but at a source accessible via the broadband connection 107. In a representative embodiment of the present invention, a broadband access gateway such as, for example the gateway 118 or the router 130 may dynamically adjust, for example, the bit rate or level of compression used in the delivery of multimedia information, based upon a number of parameters.

In a representative embodiment of the present invention, a broadband access gateway such as, for example the gateway 118 or the router 130 may determine that the bandwidth needed to meet the quality of service criteria defined by a user may not be available, and may notify the user of that fact. For example, the gateway 118 of FIG. 2 may determine that delivery of a full motion video clip cannot be accomplished within the quality of service criteria set by the user. The gateway 118 may automatically identify adjustments in, for example, picture or sound quality, that enable the gateway to deliver the requested video clip within the quality of service criteria of the user. In another representative embodiment of the present invention, the gateway 118 may determine that no combination of adjustments meet the user quality of service criteria. In such a situation, a broadband access gateway may offer to the user one or more choices. For example, the user may be offered the options of an image of lower spatial resolution, the muting of any accompanying audio, a reduction in the frame rate, or the omission of frames of video. That is, the gateway may allow the user to make adjustments affecting quality of service, to enable the user to access the desired multimedia information with a quality of service that is acceptable to the user. By allowing the user to select the form and level of any degradation that may occur, the user may optimize their multimedia access experience, and permit multimedia access that may otherwise be restricted. A broadband access gateway in accordance with a representative embodiment of the present invention may learn from past user selections the most likely future user choice of system adjustments. The user may also be given a choice to override their previously defined criteria. For example, a user may be permitted to increase the permissible cost of the delivery, or decrease, for example, a frame rate of playback of a video clip. In a representative embodiment of the present invention, a user of an access device may select lower quality audio when the desire to have access to a particular audio program is high. A broadband access gateway in accordance with a representative embodiment of the present invention may identify and offer to a user a variety of delivery options, to enable a user to select a quality of service that best suits their needs.

A broadband access gateway in accordance with a representative embodiment of the present invention such as, for example, the gateway 118 may automatically modify, for example, the encoded bit rate or compression factor of multimedia information being transported, in order to enable an access device such as, for example, the access device 124 of FIG. 2 to provide a satisfactory multimedia consumption experience. For example, a user of an access device such as, for example, the access device 124 or the wireless PDA 119 of FIG. 2 may wish to play a music file encoded at a bit rate of 384 kilobits per second (kbps) using the MP3 encoding scheme, while in the coverage area of the gateway 118. A Bluetooth radio frequency link having a current bandwidth limit of 128 kbps may enable communication with the gateway 118. In order to support the consumption of the 384 kbps-encoded MP3 music information via the 128 kbps Bluetooth link, the gateway 118 may reduce the required bandwidth by transcoding the digital music information to the lower bit rate.

In a representative embodiment of the present invention, if the compression used to permit the consumption of a particular form of multimedia information is not "lossless", and causes a reduction in the quality of the images or the sound reproduced, a broadband access gateway in accordance with a representative embodiment of the present invention may reduce the level of compression, or eliminate the use of compression altogether, depending upon the user-defined quality of service criteria, and the bandwidth available in the path to the consumer.

In a representative embodiment of the present invention, a broadband access gateway such as, for example, the gateway 118 or router 130, may determine the available bandwidth available upon receiving a request for playback of an audio or video clip. The broadband access gateway may attempt to retrieve a version of the requested multimedia information encoded for transmission at or below the available bandwidth. For example, many protocol standards used for the exchange of audio and video support the encoding of multimedia information specifically for transmission via communications channels having minimum expected bandwidths. An embodiment of the present invention may seek a version of the requested subject matter that has been encoded for transmission via a channel using the bandwidth that is currently available, or that meets the user-defined quality of service criteria.

Figure 4:
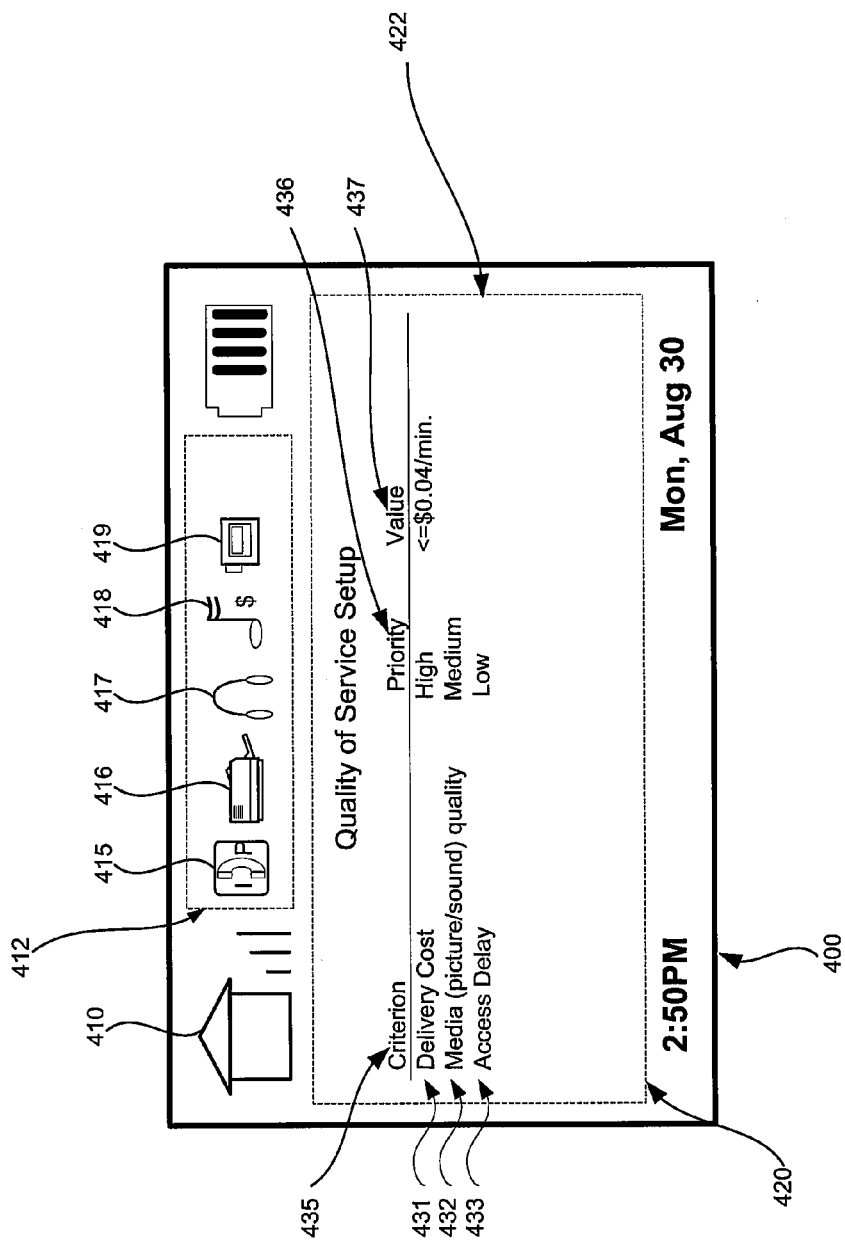
FIG. 4 shows exemplary quality of service setup information within a display area of an access device that may correspond, for example, to the access device or wireless PDA of FIGS. 1 and 2, in accordance with a representative embodiment of the present invention.

FIG. 4 shows exemplary quality of service setup information within a display area 420 of an access device that may correspond, for example, to the access device 124 or the wireless PDA 119 of FIGS. 1 and 2, in accordance with a representative embodiment of the present invention. The display 400 of FIG. 4 comprises a network indicator 410, a network services indicator area 412, a battery life indicator, a time of day indicator, and a day and date indicator. The display 400 also comprises a display area 420 to allow an access device to present graphical or textual information for a variety of reasons and from a number of sources. The network services indicator area 412 in the example of FIG. 4 shows an Internet protocol (IP) phone service icon 415, a printer service icon 416, a stereo entertainment icon 417, a pay music service icon 418, and a video entertainment icon 419. The display area 420 of FIG. 4 has been arranged in a tabular format comprising a criterion column 435, a priority column 436, and a value column 437. The display area 420 shows three user-defined quality of service criteria entries 431, 432, 433 that indicate the relative importance or priority of three aspects of multimedia consumption that define quality of service for the user of the associated access device. As shown in FIG. 4, the user has indicated in criteria entry 431 that "Delivery Cost" has a priority of "High", and should be less than $0.04 per minute. The next criteria entry 432 indicates that the user desires to have "Media Quality" as the next in importance. For this user, the third criteria entry 433 shows that "Access Delay" is the lowest priority when making adjustments for bandwidth limitation of the delivery path. Although the illustration of FIG. 4 uses a tabular format, and textual indicators of only three user-defined quality of service criteria and associated priorities are shown, many other forms of user interface could be employed without departing from the spirit of the present invention For example, the user may be offered a graphical interface, priority may be indicated by numeric value or size or design of an icon, and priority may be expressed in the form of a comparative or logical relationship between criteria. The illustration of FIG. 4 is meant to act as an aid to the understanding of one possible embodiment of the present invention, and does not represent limitations of the present invention as other user interfaces are contemplated.

In a representative embodiment of the present invention, payment for services such as those described above with respect to FIG. 4 may be submitted in the form of, for example, a digital certificate that may be provided to the user by another. For example, a user of an access device may be given access to various services by another subscriber, or by a provider of services as a form of promotion, using electronic delivery of a digital certificate allowing service access. Other users of access devices may render payment for services by registering for service and providing billing particulars such as, for example, billing address, credit information, credit or debit card numbers, and the like, before or at the time that initial service access is attempted. Additional details of registration of users for service access in a communication system such as that shown in FIGS. 1 and 2 may be found in U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety.

Figure 5:
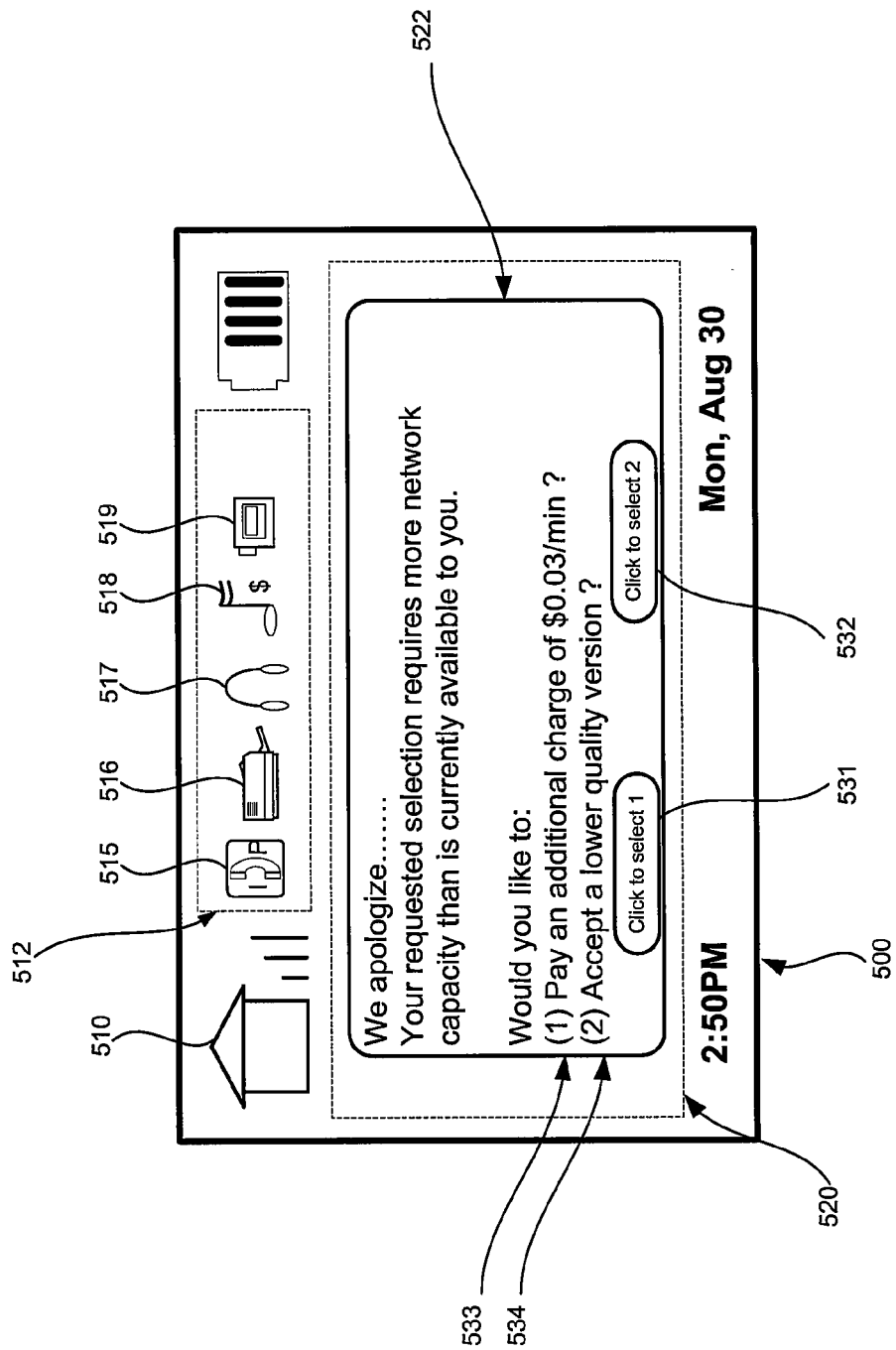
FIG. 5 shows an exemplary pop-up message in the display area of an access device that may correspond, for example, to the access device or wireless PDA of FIGS. 1 and 2, in accordance with a representative embodiment of the present invention.

FIG. 5 shows an exemplary pop-up message 522 in the display area 520 of an access device that may correspond, for example, to the access device 124 or wireless PDA 119 of FIGS. 1 and 2, in accordance with a representative embodiment of the present invention. The display 500 of FIG. 5 comprises a network indicator 510, a network services indicator area 512, a battery life indicator, a time of day indicator, and a day and date indicator. The display 500 also comprises a display area 520 to allow an access device to present graphical or textual information for a variety of reasons and from a number of sources. The network services indicator area 512 in the example of FIG. 5 shows an Internet protocol (IP) phone service icon 515, a printer service icon 516, a stereo entertainment icon 517, a pay music service icon 518, and a video entertainment icon 519. The display area 520 of FIG. 5 illustrates a pop-up message 522 notifying the user of the access device that a request for access to, for example, video multimedia information requires the use of more network capacity than is currently available to the user under the current set of user-defined quality of service criteria. In the illustration of FIG. 5, the user-defined quality of service criteria may correspond, for example, to the user-defined quality of service criteria shown in FIG. 4. In a representative embodiment of the present invention, a user in such a situation may, for example, be offered an opportunity to override one of the pre-defined quality of service criteria, by authorizing an increase in the cost of the bandwidth needed for multimedia consumption. Such an option is shown in FIG. 5 as item 533. The user of the access device may select item 533 by clicking on button 531. The user may also be offered the option of viewing a lower-quality version of the requested multimedia item. Such an option is shown in FIG. 5 as item 534. The user of the access device may select item 534 by clicking on button 532. Various representative embodiments of the present invention may offer options such as those shown in FIG. 5, to permit a user to temporarily re-define the quality of service criteria. The use of a pop-up message 522 is one example of a mechanism by which the user of the access device may be notified. Other methods include, for example, the playing of an audio signal, or playback of a voice message. By presenting the user with an opportunity to select the form of an adjustment in system behavior, a representative embodiment of the present invention provides flexibility when user needs or network conditions change.

Figure 6:
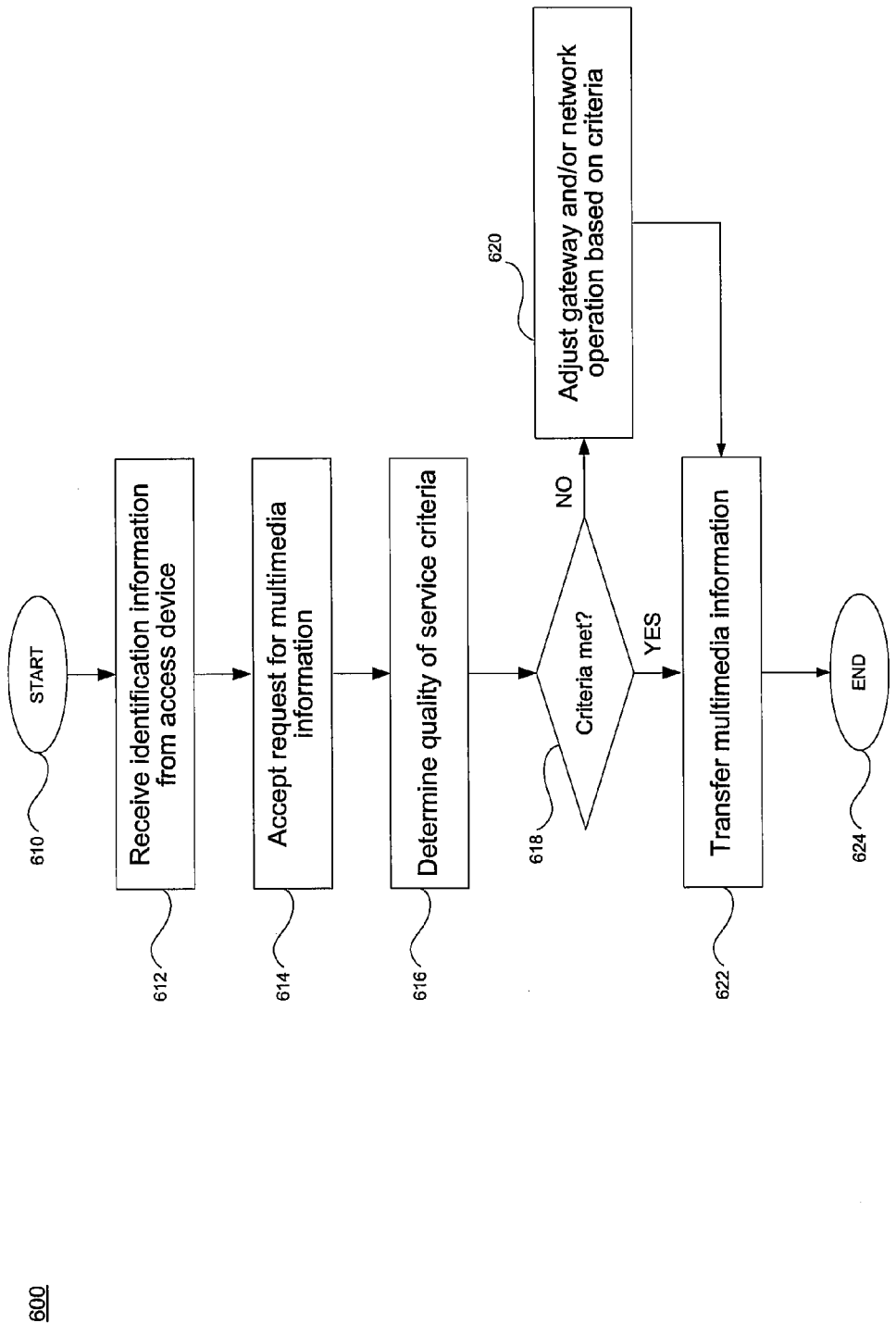
FIG. 6 is a flowchart of an exemplary method of supporting location-based quality of service in a broadband access gateway that may correspond, for example, to the gateway or the router of FIGS. 1 and 2, in accordance with a representative embodiment of the present invention.

FIG. 6 is a flowchart 600 of an exemplary method of supporting location-based quality of service in a broadband access gateway that may correspond, for example, to the gateway 118 or the router 130 of FIGS. 1 and 2, in accordance with a representative embodiment of the present invention. The method of FIG. 6 begins (block 610) when a broadband access gateway such as, for example, the gateway 118 or router 130 of FIGS. 1 and 2 is powered up. At some later point in time, the gateway may receive, from an access device, information identifying the access device and/or the user of the access device (block 612). Information identifying an access device may include, for example, an electronic serial number, an Internet protocol (IP) address, a media access control (MAC) address, information identifying a make of an access device, and information identifying a model of an access device. Information identifying the user of an access device may comprise, for example, a member identifier, a user name, an administrative identifier, and a credit card number. The identification information may, for example, be provided by an access device upon entry into a coverage area of a gateway, or periodically when in communication with a gateway. Later, the gateway 118 may receive a request for multimedia information such as, for example, a video or audio clip (block 614). As described above, the requested multimedia information may be encoded for transmission via a pathway having at least a predefined amount of bandwidth available. The broadband access gateway may then identify a set of quality of service criteria that are applicable to the request, using the received identification information (block 616). A check is then made whether the quality of service criteria are currently met for delivery of the multimedia information (block 618). If the criteria are met, the multimedia information may be transferred to the access device (block 622), and the method is complete (block 624). If, however, the criteria are currently not met (block 618), the broadband access gateway may make adjustments in gateway operation and/or may coordinate adjustments to parameters of network operation consistent with the user-defined criteria (block 620). Such adjustments may include, for example, the adaptation of the bit rate in which the multimedia information to the available network bandwidth, adjustments to levels of compression used, and to selection of an alternate, lower bit-rate version of the requested multimedia information. The multimedia information may then be transferred to the access device (block 622), and the method is completed (block 624).

Figure 7:
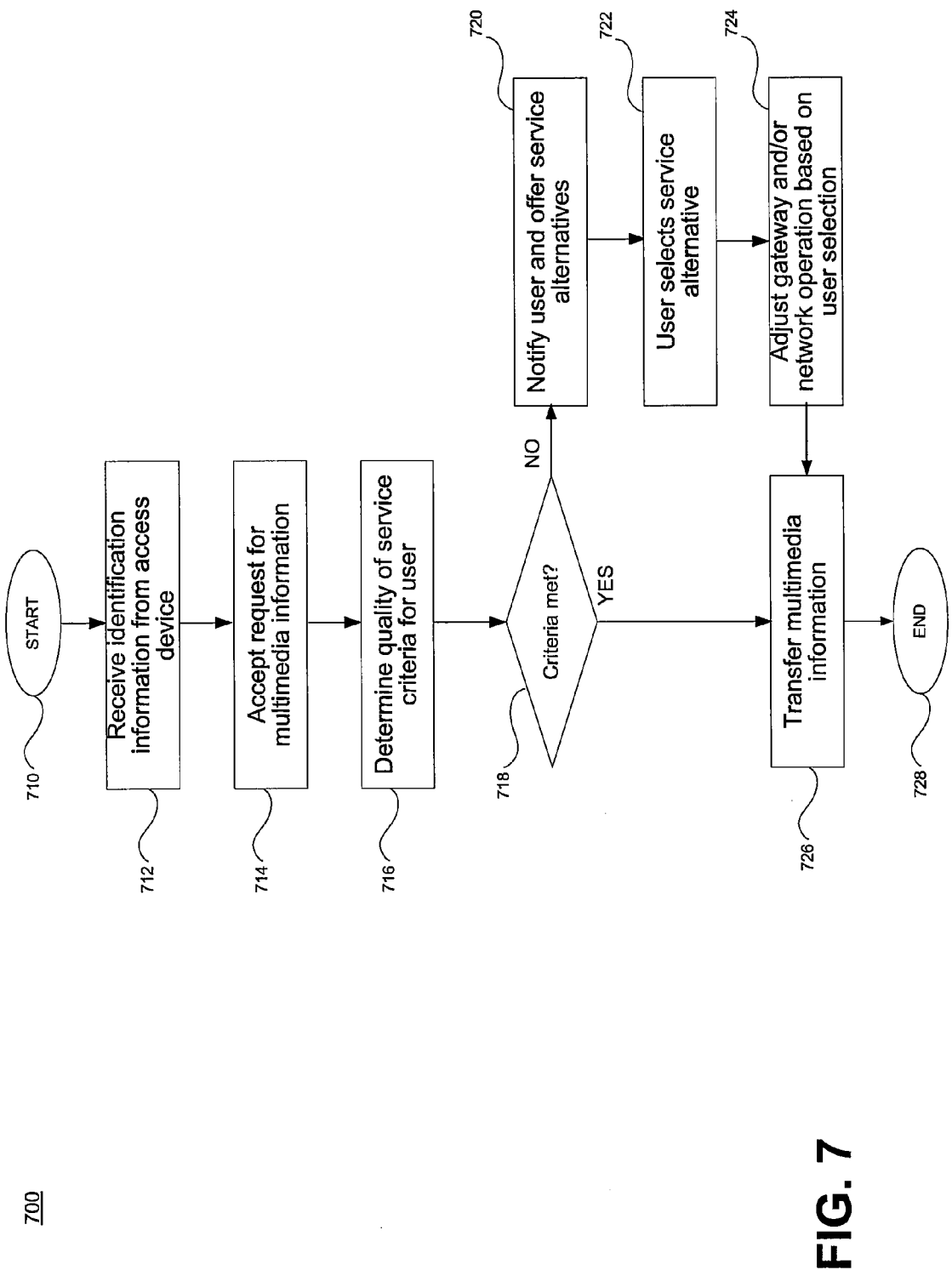
FIG. 7 is a flowchart of another exemplary method of supporting location-based quality of service in a broadband access gateway that may correspond, for example, to the gateway or the router of FIGS. 1 and 2, in accordance with a representative embodiment of the present invention.

FIG. 7 is a flowchart 700 of another exemplary method of supporting location-based quality of service in a broadband access gateway that may correspond, for example, to the gateway 118 or the router 130 of FIGS. 1 and 2, in accordance with a representative embodiment of the present invention. The method of FIG. 7 begins (block 710) when a broadband access gateway such as, for example, the gateway 118 or router 130 of FIGS. 1 and 2 is powered up. Later, the gateway receives identification information from an access device such as, for example, the access device 124, laptop 117, or wireless PDA 119 of FIG. 2 (block 712). The identification information may be received from an access device when it enters the coverage area of a gateway, or periodically while the access device is in communication with a gateway. Some time later, the gateway 118 may receive a request for multimedia information (block 714). The requested multimedia information may comprise, for example, a segment of streaming (i.e., real time) video or audio. As previous described, the requested multimedia information may be encoded for transmission via a pathway having at least a predefined amount of bandwidth available. The broadband access gateway may then identify any quality of service criteria that are applicable to the request, based upon the identification information previously received (block 716). A determination is then made as to whether the quality of service criteria are currently met for transfer of the multimedia information to the location of the access device (block 718). If the criteria are met, the multimedia information may be transferred to the access device (block 726), and the method is completed (block 728). If, however, the criteria cannot currently be met (block 718), the broadband access gateway may notify the user of the access device of a quality of service issue, and may offer alternatives or options regarding adjustment of system operation (block 720) An example of such a notification using a pop-up message is discussed above with respect to FIG. 5. Upon receiving the notification, the user may select one or more of the offered service alternatives or options (block 722), and the gateway may make adjustments in gateway operation and/or may coordinate adjustments in network operation consistent with the user-defined quality of service criteria (block 724). Such adjustments may include, for example, the adaptation of the bit rate in which the multimedia information to the available network bandwidth, adjustments to levels of compression used, and to selection of an alternate, lower bit-rate version of the requested multimedia information. The multimedia information may then be transferred to the access device (block 726), and the method of the illustration is complete (block 728).

Although the methods illustrated in FIGS. 6 and 7 are shown as being performed as a single pass or event, a representative embodiment of the present invention may loop, to repeat the check of conditions affecting access to the requested multimedia information, to insure that the desired quality of service is met. As discussed above, movement of an access device may change its location sufficiently to cause a change in the communication pathway used for access to multimedia information. As changes in the communications pathway occur, increase and decreases in the available network capacity may occur, impacting the ability of the network to deliver the desired level of service. By repeatedly evaluating whether the quality of service desired by the consumer can be met and by adjusting system behavior, a broadband access gateway in accordance with a representative embodiment of the present invention maximizes the quality of service experienced by the user.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Aspects of the present invention may be seen in a system supporting access to multimedia information by a plurality of access devices using location-aware quality of service management. Such a system may comprise a gateway communicatively coupled to a broadband network and at least one wireless interface. The gateway may be capable of selectively exchanging multimedia information among the at least one wireless interface and the broadband network, and of communicating with the plurality of access devices via the at least one wireless interface. In a representative embodiment of the present invention, the gateway may be capable of receiving from at least one of the plurality of access devices, at least one of information identifying an access device and information identifying a user. The gateway may also be capable of accessing at least one user-defined quality of service criterion based upon the at least one of information identifying an access device and information identifying a user. In addition, the gateway may be capable of accepting a request for delivery of identified multimedia information, and of adjusting at least one parameter of the identified multimedia information based on the at least one user-defined quality of service criterion, to enable delivery.

In various representative embodiments in accordance with the present invention, multimedia information may comprise at least one of streaming video, broadcast video, voice, digital data, text, digitized audio, digitized still images, digitized video, and digitized music. The at least one user-defined quality of service criterion may comprise one of a bit rate, a bandwidth, a spatial resolution, a measure of gray scale levels, a color depth, a frame rate, a measure of dropped frames, a cost of usage, a measure of distortion of an audio signal, and a delivery delay. The at least one wireless interface may be compliant with the Bluetooth V1.2 or compatible personal area network (PAN) specification. The at least one wireless interface may communicate using an unlicensed frequency band, and may communicate at a frequency of approximately 2.4 gigahertz. In addition, the at least one wireless interface may be compliant with at least one of the Institute of Electrical and Electronics Engineers (IEEE) 802.11a, 802.11b, 802.11g, and 802.11n standards. The broadband network may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system (UMTS) network.

In a representative embodiment of the present invention, the information identifying a user may comprise at least one of a member identifier, a user name, an administrative identifier, and a credit card number. The information identifying an access device may comprise at least one of an electronic serial number, an Internet protocol (IP) address, a media access control (MAC) address, information identifying a make of an access device, and information identifying a model of an access device. The plurality of access devices may comprise at least one of a mobile multimedia handset, a personal digital assistant (PDA), a personal computer (PC), a digital scanner, a digital camera, a printer, headphones, and a pointing device. A system in accordance with a representative embodiment of the present invention may be capable of delivering the identified multimedia information to the at least one of the plurality of access devices, and may be capable of notifying the at least one of the plurality of access devices of an inability to deliver the identified multimedia information based upon the at least one user-defined quality of service criterion. The at least one user-defined quality of service criterion may be sent to the gateway by the at least one of the plurality of access devices, and the at least one parameter may comprise one of a bit rate and a level of compression.

Further aspects of the present invention may be found in a method supporting access to multimedia information by a plurality of access devices using location-aware quality of service management. Such a method may comprise receiving from at least one of the plurality of access devices via a wireless network, at least one of information identifying an access device and information identifying a user, and accessing at least one user-defined quality of service criterion based upon the at least one of information identifying an access device and information identifying a user. The method may also comprise accepting a request for delivery of identified multimedia information, and adjusting at least one parameter of the identified multimedia information based on the at least one user-defined quality of service criterion, to enable delivery of the identified multimedia information via the wireless network. The multimedia information may comprise at least one of streaming video, broadcast video, voice, digital data, text, digitized audio, digitized still images, digitized video, and digitized music. In various representative embodiments of the present invention, the at least one user-defined quality of service criterion may comprise one of a bit rate, a bandwidth, a spatial resolution, a measure of gray scale levels, a color depth, a frame rate, a measure of dropped frames, a cost of usage, a measure of distortion of an audio signal, and a delivery delay.

In a representative embodiment in accordance with the present invention, the wireless network may be compliant with the Bluetooth V1.2 or compatible personal area network (PAN) specification. The wireless network may communicate using an unlicensed frequency band, and may communicate at a frequency of approximately 2.4 gigahertz. In addition, the wireless network may be compliant with at least one of the Institute of Electrical and Electronics Engineers (IEEE) 802.11a, 802.11b, 802.11g, and 802.11n standards. A method in accordance with a representative embodiment of the present invention may also comprise transferring the identified multimedia information from a broadband network. The broadband network may comprise at least one of a digital subscriber line (DSL) network, a cable network, a satellite network, a cellular network, and the Internet. The cellular network in various representative embodiments of the present invention may comprise at least one of a global system for mobile communications (GSM) network, a time division multiple access (TDMA) network, a code division multiple access (CDMA) network, and a universal mobile telecommunications system (UMTS) network. The information identifying a user may comprise at least one of a member identifier, a user name, an administrative identifier, and a credit card number. The information identifying an access device may comprise at least one of an electronic serial number, an Internet protocol (IP) address, a media access control (MAC) address, information identifying a make of an access device, and information identifying a model of an access device. The plurality of access devices may comprise at least one of a mobile multimedia handset, a personal digital assistant (PDA), a personal computer (PC), a digital scanner, a digital camera, a printer, headphones, and a pointing device.

A representative embodiment of the present invention may also comprise delivering the identified multimedia information to the at least one of the plurality of access devices, and notifying the at least one of the plurality of access devices of an inability to deliver the identified multimedia information based upon the at least one user-defined quality of service criterion. The at least one user-defined quality of service criterion may be sent to the gateway by the at least one of the plurality of access devices, and the at least one parameter may comprise one of a bit rate and a level of compression.

Yet other aspects of the present invention may be observed in a machine-readable storage, having stored thereon a computer program having a plurality of code sections executable by a machine, for causing the machine to perform the operations of the method described above.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. One or more circuits supporting access to multimedia information by an access device, using location-aware quality of service management in a communication network, the one or more circuits comprising:
   at least one processor operatively coupled to interface circuitry for communicating over the communication network, the at least one processor operable to, at least:
   receive information identifying one or both of the access device and a user;
   determine an approximate current location of the access device;
   access at least one user-defined quality of service criterion based upon the information identifying one or both of an access device and a user;
   accept a request for delivery of identified multimedia information;
   using the approximate current location of the access device, determine a first available bandwidth at the approximate current location of the access device;
   adjust at least one parameter of the identified multimedia information to conform to the first available bandwidth at the approximate current location of the access device and to conform to the at least one user-defined quality of service criterion to provide a first quality of service level upon delivery of the identified multimedia information to the user;
   subsequently, following a location change of the access device in the communication network, determine a new location of the access device;
   determine a second available bandwidth at the new location of the access device, the second available bandwidth being different from the first available bandwidth; and
   adjust the at least one parameter of the identified multimedia information to conform to the second available bandwidth and to the at least one user-defined quality of service criterion to provide a second quality of service level upon delivery of the identified multimedia information to the user that is different from the first quality of service level.

2. The one or more circuits according to claim 1, wherein multimedia information comprises one or more of streaming video, broadcast video, voice, digital data, text, digitized audio, digitized still images, digitized video, and/or digitized music.

3. The one or more circuits according to claim 1, wherein the interface circuitry communicates wirelessly over the communication network using a protocol compliant with the BLUETOOTH V1.2 or compatible personal area network (PAN) specification.

4. The one or more circuits according to claim 1, wherein the interface circuitry communicates wirelessly over the communication network using an unlicensed frequency band.

5. The one or more circuits according to claim 1, wherein the interface circuitry communicates wirelessly over the communication network at a frequency of approximately 2.4 gigahertz.

6. The one or more circuits according to claim 1, wherein the interface circuitry is compliant with one or more of the Institute of Electrical and Electronics Engineers (IEEE) 802.11 a, 802.11 b, 802.11 g, and/or 802.11 n standards.

7. The one or more circuits according to claim 1, wherein the communication network comprises one or more of a digital subscriber line (DSL) network, a cable network, a satellite network, a cellular network, and/or the Internet.

8. The one or more circuits according to claim 7, wherein the cellular network comprises one or more of a global system for mobile communications (GSM) network, a time division multiple access (TDMA) network, a code division multiple access (CDMA) network, and/or a universal mobile telecommunications system (UMTS) network.

9. The one or more circuits according to claim 1, wherein the information identifying a user comprises one or more of a member identifier, a user name, an administrative identifier, and/or a credit card number.

10. The one or more circuits according to claim 1, wherein the information identifying the access device comprises one or more of an electronic serial number, an Internet protocol (IP) address, a media access control (MAC) address, information identifying a make of the access device, and/or information identifying a model of the access device.

11. The one or more circuits according to claim 1, wherein the at least one user-defined quality of service criterion comprises one or more of a bit rate, a bandwidth, a spatial resolution, a measure of gray scale levels, a color depth, a frame rate, a measure of dropped frames, a cost of usage, a measure of distortion of an audio signal, and/or a delivery delay.

12. The one or more circuits according to claim 1, wherein the access device comprises one of the following: a mobile multimedia handset, a personal digital assistant (PDA), a personal computer (PC), a digital scanner, a digital camera, a printer, headphones, or a pointing device.

13. The one or more circuits according to claim 1, wherein the user is notified of an inability to deliver the identified multimedia information to the user in accordance with the at least one user-defined quality of service criterion.

14. The one or more circuits according to claim 1, wherein the user is permitted to select one or both of a form and a level of degradation due to the adjustment of the at least one parameter.

15. The one or more circuits according to claim 1, wherein the at least one user-defined quality of service criterion is transmitted to a gateway by the access device.

16. The one or more circuits according to claim 1, wherein the at least one parameter comprises one of a bit rate and a level of compression.

17. The one or more circuits according to claim 1, where the multimedia information comprises a real-time media stream.

* * * * *